United States Patent [19]
Moore, Jr. et al.

[11] Patent Number: 5,421,319
[45] Date of Patent: Jun. 6, 1995

[54] HEATING SYSTEM FOR BARBECUE GRILLS AND OTHER GAS APPLIANCES

[75] Inventors: Roger R. Moore, Jr.; Robert L. Johnston, both of Columbus, Ga.

[73] Assignee: W. C. Bradley Company, Columbus, Ga.

[21] Appl. No.: 106,424

[22] Filed: Aug. 13, 1993

[51] Int. Cl.6 ............................................. F24C 3/00
[52] U.S. Cl. ............................ 126/41 R; 126/25 R; 99/400
[58] Field of Search ............ 126/41 R, 299 R, 299 D, 126/39 R, 25 R, 9 R, 39 G; 99/400, 401

[56] References Cited

U.S. PATENT DOCUMENTS

| | | | |
|---|---|---|---|
| 4,741,321 | 5/1988 | Squires | 126/41 R X |
| 4,815,439 | 3/1989 | Houck | 126/41 R X |
| 4,827,903 | 5/1989 | Kim | 126/41 R X |
| 5,062,408 | 11/1991 | Smith et al. | 126/395 |
| 5,117,747 | 6/1992 | Kuechler | 126/41 R X |

*Primary Examiner*—Larry Jones
*Attorney, Agent, or Firm*—Hopkins and Thomas; James W. Kayden

[57] ABSTRACT

A heating system for barbecue grills and other gas appliances is disclosed, the system having a U-shaped tubular burner and shield. The system may also include a radiant material disposed below the burner.

8 Claims, 2 Drawing Sheets

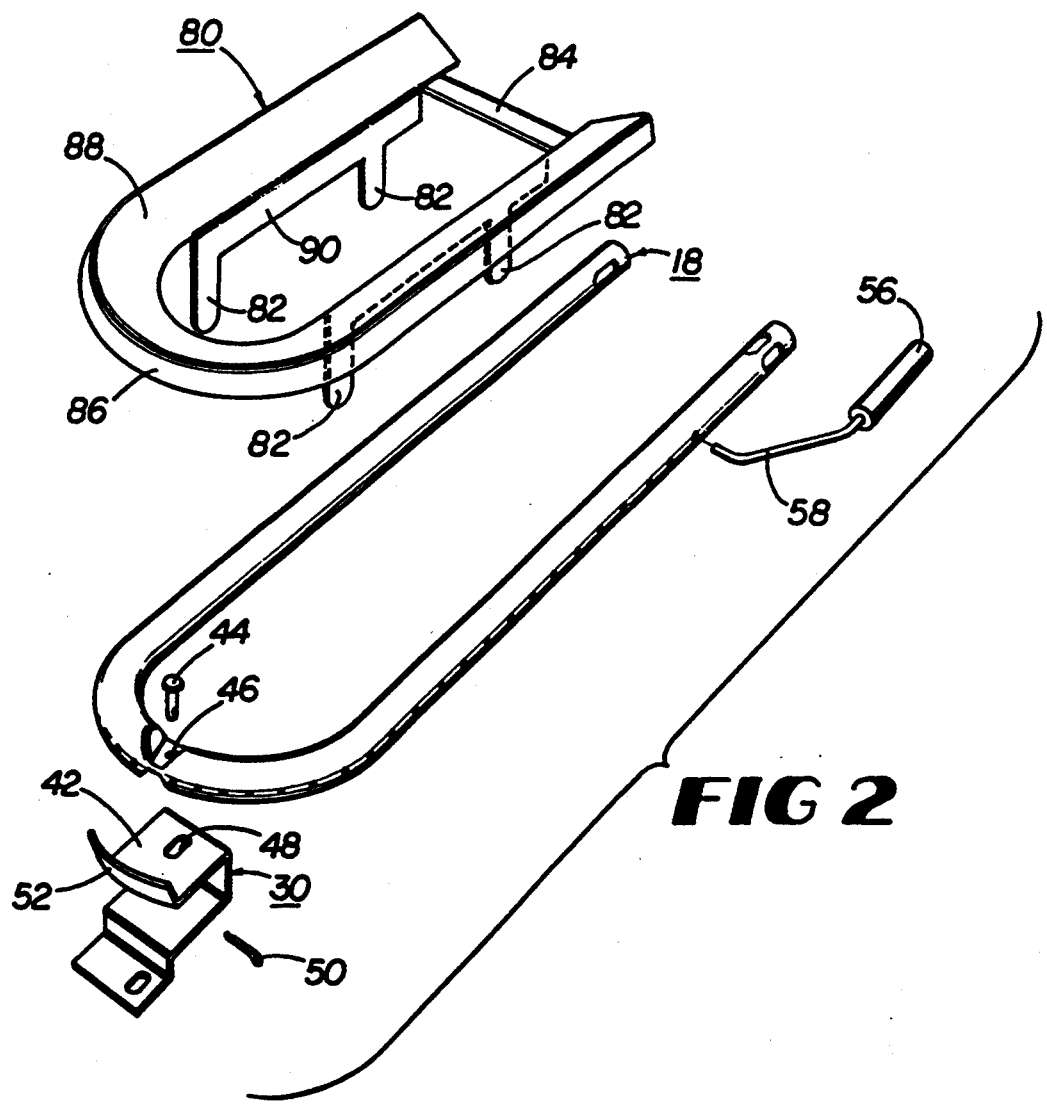
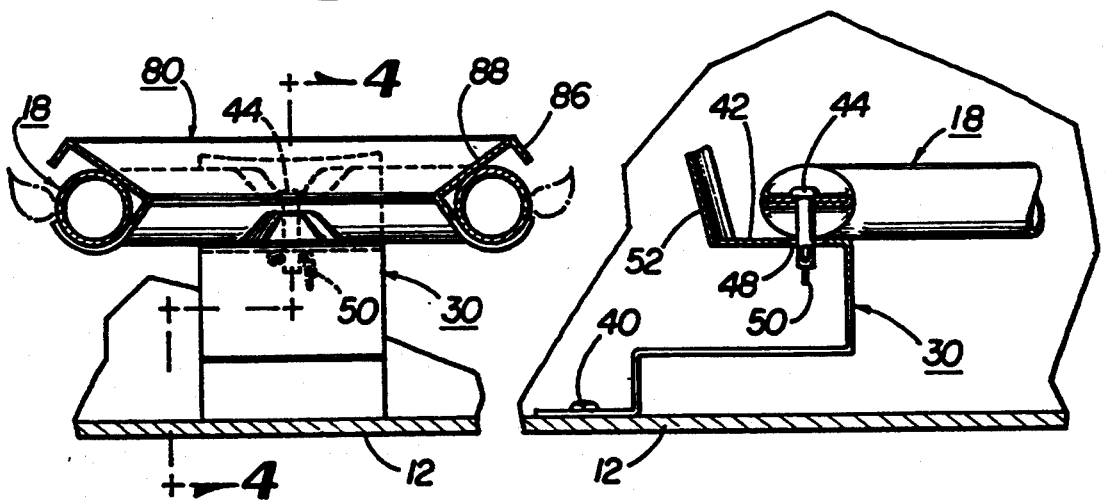
FIG 2
FIG 3
FIG 4

HEATING SYSTEM FOR BARBECUE GRILLS AND OTHER GAS APPLIANCES

FIELD OF THE INVENTION

The invention disclosed herein relates to gas-fired barbecue grills and to burners capable for use in such grills.

BACKGROUND OF THE INVENTION

Gas-fired barbecue grills continue to increase in popularity due to their convenience of operation, relatively instant availability for use in cooking, and design improvements which facilitate their assembly and use. One major concern with gas barbecue grills has been the reduction of flare-ups caused by the ignition of grease. Since the flame in a gas-fired grill cannot be smothered by oxygen deprivation as with charcoal grills, any accumulated grease or grease from the food then being cooked can ignite given the right conditions.

Prior art grills have used a variety of means to provide and radiate heat while trying to minimize the incidence of flare-ups or uncontrolled flames. Metal sear grids, which attain very high temperatures in an attempt to vaporize grease, have been in use since the 1930's. Porous lava rock, the pores of which accumulate grease, radiates heat but tends to readily ignite with continued use. Various other means and combinations thereof have also been tried but none have provided anything that could be termed completely satisfactory.

Other concerns expressed by consumers to grill manufacturers include the need for even heat distribution and thus, even cooking of food; ease of clean-up; and sufficient versatility to cook a variety of different foods in a variety of different ways. Thus, there is a continuing need in the art for a barbecue grill which avoids the disadvantages of prior art models, while providing the desired advantages mentioned hereinabove. Some of the same concerns apply to other types of gas appliances as well and are also addressed by the present invention.

SUMMARY OF THE INVENTION

It is, therefore, one of the principal objects of the present invention to provide a heating system that distributes heat to all of the cooking areas of the grill or appliance, thus providing superior cooking performance.

Another object of the present invention is to provide for the efficient use of fuel with a novel heating system design that reduces the amount of fuel necessary to reach and maintain optimum cooking or heating temperatures.

A further object of the present invention is to provide easier and more efficient temperature control with a unique and novel heating system which incorporates radiant material below a new type of burner.

A still further object of the present invention is to provide an improved ignition system for the improved burner and to provide a gas barbecue grill that is durable for providing a long service life.

These and other objects and advantages are attained by the present heating system which relates to an improved burner design coupled with a different arrangement between the burner, the radiant, if used, and the lower housing or firebox. The present heating system is useful for many types of gas appliances such as barbecue grills, kitchen ranges, water heaters, and others. For ease of description, the following specification will focus on barbecue grills. The burner is substantially U-shaped and directs the heat generated thereby outwardly toward the perimeter of the appliance. This arrangement has been tested and found to provide a better heat application across the cooking surface. The burner is protected from grease or other drippings by a shield means attached thereto and having a shape similar to the burner. The shield also facilitates grease evacuation to reduce the possibility of flare-ups. Radiant means are disposed below the level of the burner gas ports. This substantially reduces the temperature achieved by the radiant means over conventional designs in which the radiant is disposed above and spaced from the burner or burners. The present invention also includes an improved ignition system which eliminates a number of previously necessary attachments such as gas collectors.

Various additional objects and advantages of the present invention will become readily apparent from the following detailed description, with reference to the accompanying drawings.

BRIEF DESCRIPTION OF THE DRAWINGS

FIG. 2 is an exploded perspective view of the burner system components;

FIG. 3 is a partial end elevational view of the burner system; and

FIG. 4 is a cross-sectional view of one end of the burner mounting assembly, the section being taken on line 4—4 of FIG. 3.

DETAILED DESCRIPTION OF THE PREFERRED EMBODIMENT

Figure 1:
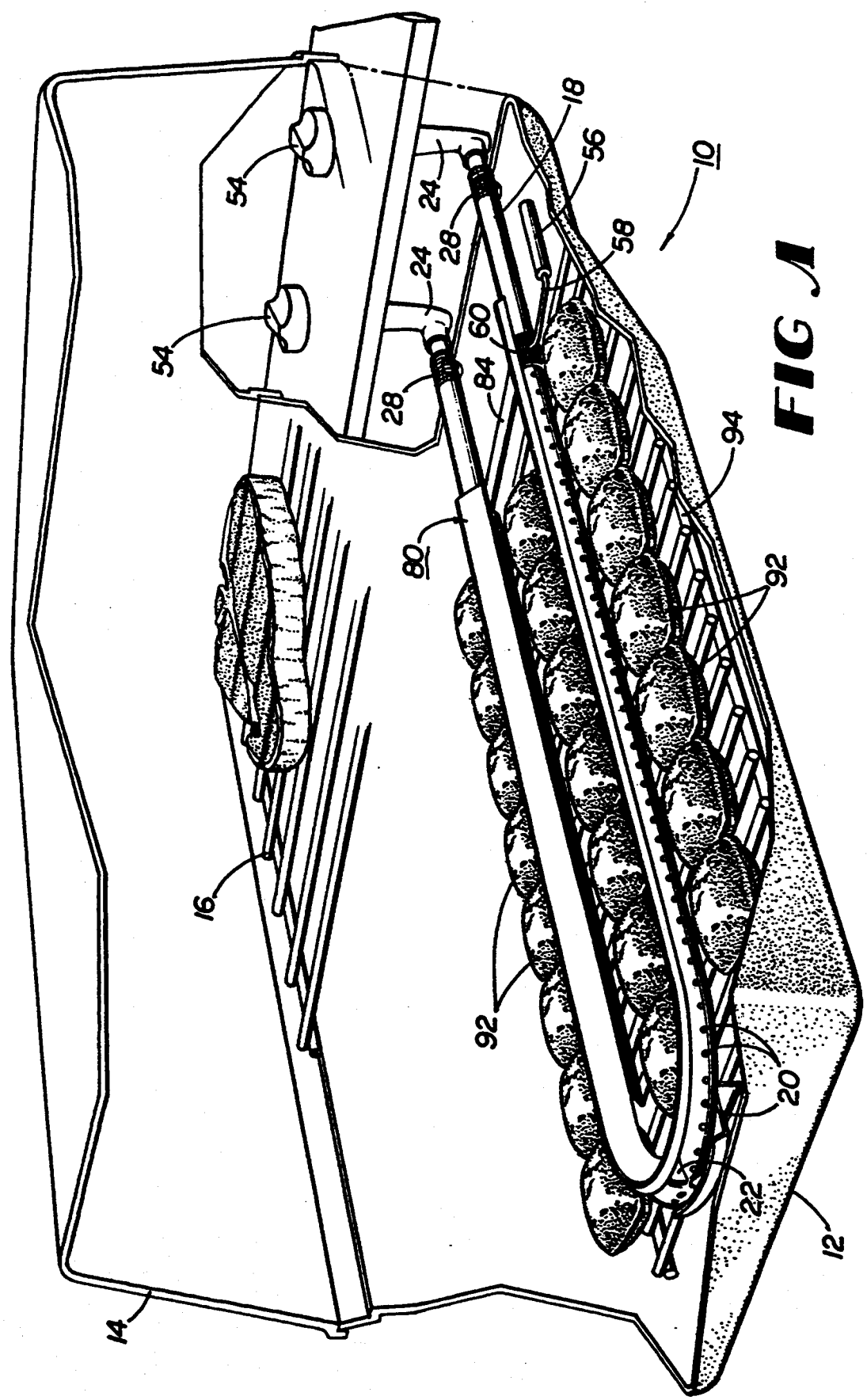
FIG. 1 is a partial perspective view illustrating the present heating system in a barbecue grill.

Referring now more specifically to the drawings, and to FIG. 1 in particular, numeral 10 designates generally a gas barbecue grill. The grill includes a bottom casting or firebox 12 and a top casting or hood 14. The design of the grill castings may vary in shape and size, one possible embodiment being shown in U.S. Pat. No. D 323,952, owned by the assignee of the present invention and incorporated herein by reference. The castings are normally made of aluminum or steel. The grill is mounted on a post or movable cart (not shown) and includes a gas supply as is well known in the art. One or more cooking racks are also provided, such as rack 16, for supporting the food being cooked.

An important characteristic of the present invention is the heating application provided thereby. As noted hereinabove, the discussion is to focus on gas barbecue grills; however, it will be apparent to those skilled in the art that the invention has substantial utility in other gas appliances and this detailed description is not meant to be limited in any way by the references to gas barbecue grills.

The invention includes an elongated tubular burner element 18 which is generally U-shaped in accord with the elongated rectangular shape of the firebox 12. Other shapes, for example, a rounded or circular design are also within the scope of the present invention. The burner is sized to provide substantially full coverage in all directions to avoid "cool" spots so that food placed anywhere on the cooking surface will receive substantially the same amount of heat with the burner in full operation. The burner ports 20 are all directed outwardly, toward the perimeter of the firebox, and are angled upwardly with port spacing of greater than 0.25" to prevent back pressure at the ports. The ports extend completely around the Perimeter of the burner within the casting area only, beginning and ending at points opposite the ignitor, which is described below. This arrangement is best shown in FIGS. 1-3.

The burner has a front portion and a rear portion as viewed in FIG. 1, the front and rear being separated by a solid wall 22 in order to split the burner into the two halves. This may also be considered as front and rear leg segments with an arcuate connector therebetween. One or both halves of the burner may be used to provide more or less heat, or direct or indirect cooking, as desired. The ends of the burner opposite the wall 22 are open and receive gas valves 24. The burner ends are slightly reduced in diameter relative to the rest of the burner to provide a close fit with the gas valve and to center the valves in the openings. Each end of the burner tube also includes air intake openings 26 through which air is drawn by the gas stream for mixing therewith and providing a completely combustible mixture. A plurality of air inlets are normally provided and sized to correspond to the maximum gas rating of the appliance. As shown in FIG. 1, the air inlets are also normally covered by mesh insect screens 28 to prevent insects nesting in the burner tubes.

With the gas valves supporting the open ends of the burner, the opposite, rounded end is supported by a mounting bracket 30. The bracket is mounted to the floor of the grill by means of a bolt 40 or similar means. The bracket provides a platform surface 42 upon which the rounded end of the burner rests. The burner is affixed to the bracket by means of a pin 44 that is disposed through a hole 46 in the crimped portion of the burner that forms the wall 22. The pin 44 then extends through an elongated slot 48 in the platform 42 whereupon it is secured with a cotter pin 50 or a similar holding means. The elongated slot 48 and the relatively wide and deep platform surface 42 provide for the expansion and contraction of the burner as it is used. The spacing between and on either side of the burner is sufficient to receive a radiant means, as further described below.

Bracket 30 also includes an upstanding curved flange 52 which has the same relative curvature as the burner. This flange directs the flame from the ignited front of the burner to the gas which is emitted from the rear portion of the burner for ignition of the rear portion. Once the entire burner is lit, either the front or the rear portion may be turned off for direct or indirect cooking, cooking small portions, etc. This is accomplished through the use of the dual gas controls 54 shown in FIG. 1.

The burner is ignited using ignitor 56. When the gas is turned on to the front portion of the burner, gas flows into the burner picking up air from the air inlets 26. The ignitor control (not shown) is pushed or turned, depending on the type of control, causing a spark to emanate from the ignitor electrode 58. The electrode tip is disposed adjacent a mesh screen 60 which covers the first burner port or ports. The screen acts as a diffuser for the gas/air stream to facilitate ignition.

The burner is covered by a shielding means, such as port shield 80. The port shield covers all of the ports to prevent ingress of grease therein as required by the standards governing gas appliance construction. The port shield rests directly on the burner and is secured thereto by means of deformable tabs 82 which extend downwardly from the shield and are bent around the burner as best shown in FIGS. 2 and 3. A leg member 84 extends between and connects the free ends of the port shield to maintain these ends in position over the burner.

The shield 80 has an outer angular, sloped flange 86 which covers the ports and helps to direct gas flow around the curved burner. Flange 86 is angled downwardly to direct grease toward the bottom of the casting where it is directed to a grease collecting cup or the like. The shield also has a central angular, sloped flange 88 which is angled downwardly toward the center of the grill to provide grease evacuation in this direction, away from the flames. Finally, the shield includes a lower flange which connects the two tabs on each side of the shield for adding strength and stability to the holding means.

Referring again to FIG. 1, a further unique feature of the present system is illustrated. The radiant material 92, in this case, special charcoal briquets for gas grills sold under the registered trademark Char-Broil ®, are disposed below the level of the burner. The briquets 92, or other radiant material, rest on a grate 94. As the burner ports 20 are angled upwardly, the flames are directed over the briquets. This arrangement warms the briquets or other radiant but does not cause the radiant to become hot enough for grease to ignite thereon. The port shield, located above the burner, does become hot but its limited and angled surface areas tend to cause grease drippings to "flash off". Tests conducted with this system arrangement have provided superior results, namely, flare-up control, and excellent cooking results with all varieties of foods tested. The arrangement of the components is also such that various cooking zones can be created, from searing-type heat to convection-type heat.

The stacked arrangement of such appliances is typically burner, shield or radiant, but not both, and then cooking grid, proceeding from bottom to top. The present system rearranges conventional practice and has instead, the radiant, the burner, the shield, and then the cooking grid, proceeding from bottom to top.

The applicability of the present burner and shield to other gas appliances will be evident to those of ordinary skill in the art. For example, the burner and shield assembly can be used for kitchen ranges, broilers, water heaters, space heaters, and other devices fueled by gas. Such uses are contemplated within the scope of this disclosure.

Therefore, while an embodiment of a heating system for barbecue grills and other gas appliances and modifications thereof have been shown and described in detail herein, various additional changes and modifications may be made without departing from the scope of the present invention.

We claim:

1. A heating system for a barbecue grill, said grill having a firebox, a hood, and means for supporting food to be cooked, said heating system comprising a U-shaped tubular burner mounted in said firebox below said means for supporting food, said burner including ports disposed around the perimeter thereof, a radiant material disposed in said firebox below said burner and at or below the level of said ports, and a shield means covering said burner for preventing drippings from the food being cooked from contacting said burner.

2. A heating system as defined in claim 1 in which said burner has a horizontal center line and said ports are disposed above said horizontal center line and angled upwardly.

3. A heating system as defined in claim 2 in which said shield means has an outer flange disposed over said ports and angled downwardly toward said radiant material.

4. A heating system as defined in claim 1 in which said shield means has an outer flange angled downwardly toward said radiant material and away from the center of said firebox and a central flange angled downwardly toward said radiant material and toward the center of said firebox.

5. A heating system as defined in claim 1 in which said shield includes deformable tabs for attaching the shield to the burner.

6. A shielded burner assembly for placement beneath an object to be heated comprising a U-shaped burner element extending in a substantially horizontal plane and including a pair of parallel tubular leg segments and a tubular arcuate segment connected at its ends to said leg segments, gas supply means connected to both of said leg segments for supplying combustible gas to both leg segments of said burner element, said leg segments each defining an aligned series of gas exhaust openings extending along the length of the leg segment and oriented so as to direct flames of gas inclined outwardly and upwardly away from said burner element;

a shield mounted over said burner element, said shield being sized and shaped to correspond to the size and shape of said burner element and to shield said burner element from items falling toward said burner element, and comprising in cross-section an apex extending over said leg segments, a first sloped surface extending downwardly from said apex to one side of the leg segment and a second sloped surface extending downwardly from said apex to the other side of said leg segment; and a radiant means disposed below said burner element for providing indirect heat supplementing that provided by said burner element.

7. A heating system for barbecue grills and other gas appliances having means for supporting an item or items to be heated, said heating system comprising a burner element disposed in said grill or appliance, below said means for supporting an item or items to be heated, and a radiant means disposed below the level of said burner element for providing supplemental, indirect heat to said item or items.

8. A heating system for a barbecue grill, said grill having a firebox and means for supporting food to be cooked, said heating system comprising a burner element mounted in said firebox below said means for supporting food, said burner element having edges including ports around said edges for providing combustible fuel therethrough and a radiant means disposed in said firebox below said burner for providing additional heat supplementary to that provided by said burner element.

* * * * *